United States Patent [19]

Oka

[11] 4,143,744
[45] Mar. 13, 1979

[54] FRICTION-PAD WEAR WARNING DEVICE FOR USE IN DISC BRAKE

[75] Inventor: Hiroyuki Oka, Toyota, Japan

[73] Assignee: Toyota Jidosha Kogyo Kabushiki Kaisha, Japan

[21] Appl. No.: 850,307

[22] Filed: Nov. 10, 1977

[30] Foreign Application Priority Data

Dec. 23, 1976 [JP] Japan .......................... 51-171836[U]

[51] Int. Cl.² ............................................. F16D 66/02
[52] U.S. Cl. .................................... 188/1 A; 116/208; 188/73.1; 188/85; 188/218 XL
[58] Field of Search ................. 188/1 A, 23.1, 250 B, 188/218, 85; 192/30 W; 116/114 Q; 303/61

[56] References Cited

U.S. PATENT DOCUMENTS 3,918,553 11/1975 Hattwig et al. ...................... 188/1 A
3,989,125 11/1976 Holst .................................. 303/61 X

*Primary Examiner*—George E. A. Halvosa
*Attorney, Agent, or Firm*—Kane, Dalsimer, Kane, Sullivan and Kurucz

[57] ABSTRACT

An annular portion is provided in a friction surface of a disc brake adjacent to the circumference of the friction surface of the disc brake at least on one side thereof. This annular portion of the friction surface of the disc brake is slowly inclined along its circumference. A friction pad adapted to be forced against the friction surface of the brake disc includes a pressure bearing portion which is adapted to be forced against the aforesaid inclined surface of the annular portion, when the friction pad is worn down beyond a wear limit. When this pressure bearing portion is pressed against the annular portion, the inclined surface of a brake disc slides on the pressure bearing portion, so that the pressure bearing portion may cyclically receive reactions from the inclined surface of the annular portion at no sacrifice of a damage thereon, because of the smooth inclined surface of the annular portion of a disc brake. The reactions are transmitted via hydraulic lines adapted to operate the pad units, to a brake pedal in the form of pulsation.

5 Claims, 2 Drawing Figures

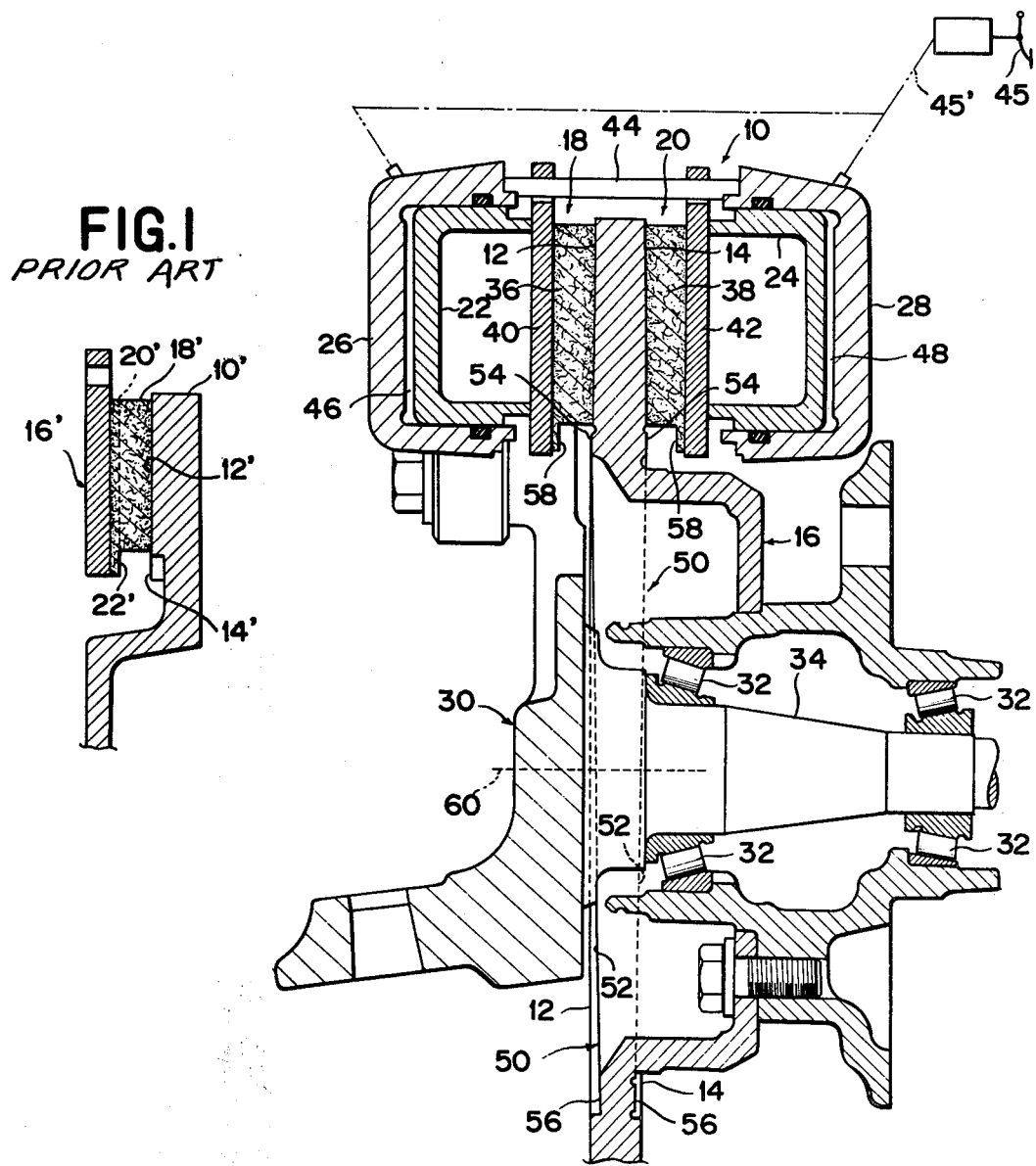

FRICTION-PAD WEAR WARNING DEVICE FOR USE IN DISC BRAKE

BACKGROUND OF THE INVENTION

1. Field of the Invention

This invention relates to a wear warning device for friction pads for use in a disc brake in a vehicle, and more particularly to a wear warning device to warn the driver to get the brake service by means of the pulsation transmitted to the brake pedal, i.e., to warn the driver on the fact that the friction pad reaches a wear limit.

2. Description of the Prior Art

One of the prior art friction-pad wear warning devices is shown in FIG. 1. As disclosed in U.S. Pat. No. 3,918,553, the warning device includes; radially protruding portions 14' which are flush with the inner edge portion of the friction surface 12' of a brake disc 10' and extend radially inwards of the brake disc 10'; and a pressure bearing portion 22' extending from a friction pad and having a surface flush with a wear-limit surface 20' of the friction pad. Accordingly, when the friction pad 18' is worn down beyond a wear limit, then the pressure bearing portion 22' abuts the protruding portions 14' on the brake disc 10'.

In the disc brake equipped with the aforesaid warning device, when a brake pedal is pushed down, then a force of a brake pedal is delivered via a hydraulic system to a piston in a disc brake, so that a piston forces a pad unit against a brake disc for the braking action. In case a friction pad is not worn down to a wear limit upon braking, then the pressure bearing portion 22' does not contact the protruding portions 14', and hence the warning device does not give off a warning. However, in case a friction pad reaches a wear limit, then the surface 20' of the friction pad becomes in alignment with the pressure bearing portion 22'. As a result, the protruding portions 14' on the disc abut the pressure bearing portion 22'. As a result, the pressure bearing portion 22' intermittently receives reactions from the protruding portions 14' positioned in non-continuous or spaced relation along the circumference of a brake disc, and then vibrations caused by the reactions are delivered from the piston, through a hydraulic circuit adapted to operate the piston, to a brake pedal in the form of pulsation. The pulsation of a brake pedal upon braking action signifies that a friction pad reaches a wear limit, and thus the driver may sense pulsation as a warning.

Meanwhile, the protruding portions 14' disposed along the circumference of a brake disc in the prior art warning device of this type are formed with edges. Accordingly, when the protruding portion 14' abuts the pressure bearing portion 20', then the edge of the protruding portion 14' damage the pressure bearing portion 22'. This would cause the pressure bearing portion to come off a friction pad, due to the contact of the protruding portions 14' with the pressure bearing portion 22' only several times. Due to this fact, the prior art warning device can give a warning only for a quite short period of time.

SUMMARY OF THE INVENTION

It is an object of the present invention to provide a wear warning device in which a pressure bearing portion or portions of a pad or pads do not come off friction pads. It is another object of the present invention to provide a wear warning device for friction pads, which device may give off a warning positively for a long period of time and provide excellent durability or a long service life.

According to the present invention, there is provided a wear warning device for a friction pad or pads, in which there are provided (i) an annular portion formed on a friction surface of a brake disc adjacent thereto but along the circumference of the brake disc, which annular portion is inclined gradually continuously, along the circumference of the brake disc, and (ii) a pressure bearing portion formed on a friction pad in opposed relation to a brake disc, whereby when the frictionpad is worn down beyond a wear limit, then the pressure bearing portion may be urged against the aforesaid inclined surface of the annular portion.

According to the present invention, when a friction pad is worn down beyond a wear limit, then the pressure bearing portion of a pad abuts an annular portion on the brake disc, so that the annular portion gives a reaction to the pressure bearing portion. The annular portion is gradually inclined along the circumference of the disc, so that the reactions applied thereto are continuously varied with the rotation of the brake disc. These reactions may be delivered to a brake pedal in the form of pulsation. However, the annular portion on the brake disc slidingly contacts the pressure bearing portion smoothly, because of the continuously or smoothly inclined surface of the annular portion, thus precluding a danger of the pressure bearing portion being damaged and hence coming off the friction pad.

BRIEF DESCRIPTION OF THE DRAWINGS

FIG. 1 is a longitudinal cross-sectional view showing part of a disc brake including a prior art friction-pad wear warning device; and FIG. 2 is a longitudinal cross-sectional view illustrative of part of the disc brake including a friction-pad wear warning device according to the present invention.

DESCRIPTION OF THE PREFERRED EMBODIMENT

The disc brake according to the invention will be described in more detail with reference to FIG. 2, which includes a warning device provided on a disc brake. In general, a disc brake 10 includes a brake disc 16 having annular friction surfaces 12,14, a pair of pad units 18,20 which are positioned on the opposite sides of the brake disc 16, and pistons 22,24 adapted to force the pad units 18,20 against the friction surfaces 12,14 of the brake disc 16, and a caliper 30 comprising cylinder portions 26,28 which admit respective pistons 22,24 therein on the opposite sides of the brake disc 16. The caliper 30 is provided with a shaft portion 34 adapted to rotatably support the brake disc 16 through the medium of bearings 32, and secured to a body (not shown) of a vehicle.

Pad units 18,20 includes friction pads 36,38, and shoes or backing plates 40,42 holding the friction pads 36,38 being positioned in opposed relation to the friction surfaces 12,14. The respective pad units 18,20 are slidingly supported by a pin 44, which interconnects both cylinder portions 26,28 and is positioned outside the periphery of the brake disc 16. Accordingly, when a brake pedal 45 is pushed down and a pressure fluid is delivered via a hydraulic line 45' to pressure chambers 46,48 in respective cylinders 26,28, then respective pistons 22,24 force the pad units 18,20 against the both friction surfaces 12,14 of the brake disc 16, respectively.

An annular portions or grooves 50 are provided on the friction surfaces 12,14 of the brake disc 16 inwardly thereof, and extend along the contours of friction surfaces 12,14 in the circumferential direction of the brake disc 16. The surfaces 52 of the annular portions 50 are gradually continuously inclined downwards from portions 54, whose surfaces are flush with the friction surfaces 12,14 towards the diameterically opposite portions shown at 56. As a result, the surface 52 of one annular portion 50 causes a cyclic back and forth displacements in the direction perpendicular to the brake disc, i.e., one cycle of back and forth displacements per one rotation of the brake disc. Two or more slopes may be provided on the surface of an annular portion along the circumference thereof in a spaced or continuous relation. However, as shown in FIG. 2, it is perferable that, as viewed in its cross section, the surface of the annular portion be inclined from the top towards the bottom thereof, being formed according to machining of metals, so that one cycle of back and forth displacements of the surface of the annular portion may result per one rotation of the brake disc. An inclined angles of the surfaces 52 of the annular portions 50 should preferably be several degrees relative to the friction surfaces 12 or 14 for causing vibrations of the pad units due to cyclic reactions acting thereon. Provided on the surfaces of the backing plates 40,42 in the respective pad units 18,20 on the side of the annular portions 50 are pressure bearing portions 58 opposed to the annular portions 50. The pressure bearing portions 58 extend from the lower edges of friction pads 36,38 integrally, as in the prior art disc brake. In addition, the surfaces of the pressure bearing portions 58 are flush with wear limit planes of the friction pads.

With the aforesaid arrangement, when the brake pedal 45 is pushed down and respective pad units 18,20 are forced against the brake disc 16 which is rotating about an axis of rotation 60, in case the friction pads 36,38 in respective pad units do not reach the wear limits, then the pressure bearing portions 58 provided on respective friction pads do not abut the annular portions 50 provided on the brake disc 16, so that respective pad units 18,20 will not be vibrated in the direction perpendicular thereto.

On the other hand, in case friction pads 36,38 in respective pad units reach the wear limits, then the pressure bearing portions 58 are slidingly moved to the positions to abut the annular portions 50. As a result, the pressure bearing portions 58 are forced against the annular portions 50 on the brake disc 16 which is rotating. In this respect, the pressure bearing portions 58 are subjected to a large reaction in the neighborhood of a portion 54, and a small reaction in the neighborhood of a position 56. As a result, the pressure bearing portions 58 are subjected to cyclic reactions until the completion of braking, so that the backing plates 40,42 in the pad units 18,20 may be vibrated in the direction perpendicular to the surfaces of the backing plates 40,42. The vibration of the backing plates 40,42 causes the pistons 22,24 to be vibrated in the direction perpendicular thereto, after which the vibration of the pistons 22,24 may be delivered via the hydraulic line 45' to the brake pedal 45 in the form of pulsation.

The pressure bearing portions 58 are brought into abuttment with the surface of the annular portion 50 gradually inclined as at 52 in the circumferential direction thereof, so the inclined surfaces 52 of the annular portions 50 may smoothly slide on the pressure bearing portions 58. Accordingly, there is no danger of the pressure bearing portions 58 being damaged due to its sliding contact with the inclined surfaces of the annular portions 50. In addition, the inclined surfaces 52 of the annular portions 50 may be formed by machining. This minimizes a manufacturing error of the annular portions. This also insures the proper operation of the warning device at a proper time for proper duration.

According to the present invention, the pressure bearing portions may be prevented from being damaged when a warning a given off, and hence the service life of the warning device may be extended, while insuring prevention of excessive wear of the friction pads in the disc brake as well as safety of the vehicle.

It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as define by the claims that follow.

What is claimed is:

1. A friction-pad wear warning device for use in a disc brake, comprising:
   a brake disc having annular friction surfaces along its circumference on the opposite sides thereof;
   a pair of pad units having friction pads in opposed relation to said friction surfaces of said brake disc;
   at least one piston for forcing said pad units against said brake disc under the pressure delivered through a hydraulic line in response to an extent of a brake pedal pushed down;
   an annular portion which is continuously provided in said brake disc at least on one side thereof adjacent to said friction surfaces and along the circumference of said brake disc, a major part of the surface of the one side of said annular portion being gradually inclined in the circumferential direction and being disposed in an inclined plane; and
   a pressure bearing portion provided on the side of said friction pad in said pad unit opposed to said brake disc, said pressure bearing portion being forced against said inclined surface of said annular portion due to said pedal being pushed down, when said friction pad is worn down beyond a wear limit, whereby cyclic reaction of said inclined annular surface of said annular portion, which is given to said pressure bearing portion, may be delivered via said hydraulic line to said pedal in the form of pulsation, the inclination of said annular surface of said annular portion causes only one cycle of substantially continuously varied back and forth displacement in the direction perpendicular thereto for each rotation of said brake disc.

2. A friction-pad wear warning device as set forth in claim 1, wherein a pair of said inclined annular surfaces are symmetrically provided in said brake disc on the opposite sides thereof, and wherein a pair of pressure bearing portions are provided in said friction pads, each pressure bearing portion being brought into contact with one of said inclined annular surfaces.

3. A friction-pad wear warning device as set forth in claim 1, wherein said pressure bearing portion integrally extends from said friction pad in protruding relation thereto.

4. A friction-pad wear warning device as set forth in claim 2, wherein said annular portion is defined in said annular friction surfaces inwardly thereof in the form of an annular groove, with the bottom surface thereof being inclined.

5. A friction-pad wear warning device as set forth in claim 4, wherein said annular groove is formed according to machining, and the surface of said annular groove is gradually inclined from one position on its circumference to a diametrically opposite position thereof, thereby said one cycle of back and forth displacements of the inclined surface of said annular portion takes place in the direction perpendicular thereto, for each rotation of said brake disc.

* * * * *